Patented Jan. 10, 1933

1,893,696

UNITED STATES PATENT OFFICE

JAMES H. COLTON, OF BERKELEY, CALIFORNIA, ASSIGNOR TO PACIFIC PORTLAND CEMENT COMPANY, CONSOLIDATED, A CORPORATION OF CALIFORNIA

PROCESS OF MANUFACTURING PORTLAND CEMENT

No Drawing. Original application filed February 4, 1926, Serial No. 86,097, now Patent No. 1,791,800. Divided and this application filed May 20, 1929. Serial No. 364,707.

This invention relates to a process of manufacturing Portland cement.

This application is a division of application Serial Number 86,097, filed February 4, 1926, now Patent No. 1,791,800.

An object of the present invention is to provide a process for manufacturing Portland cement by which the cement may be calcined and clinkered at lower temperatures than can be employed under the standard methods of manufacturing Portland cement.

Another object of the present invention is to provide a process for manufacturing Portland cement which will produce a quick-hardening cement producing high early tensile strengths and high early compression strength.

Another object of the present invention is to provide a process of manufacturing Portland cement with improved quick-hardening and high tensile and compression strength without changing the chemical analysis of the ordinary mix used in the production of standard Portland cement.

I have discovered that if in the calcining of Portland cement, a quantity of previously calcined and ground cement clinker is added to the raw mix, the calcining of the mix may proceed at a lower temperature than is usually necessary and the resultant cement clinker gives a higher early strength and possesses superior hardening qualities than the Portland cement resulting from the standard methods of production. The particular reasons why the addition of such pre-burned and ground clinker to the raw mix should produce these results is not definitely known but it is believed that the pre-burned, ground clinker acts as a catalyzer during the calcining operation and brings about a better combination of the calcium aluminum silicates present.

Apparently a Portland cement which produces high early tensile and compression strengths can be produced by clinkering a properly proportioned argillaceous and calcareous mixture grinding such clinker, again clinkering such ground clinker and finally grinding such re-clinkered material. Either all or only a portion of the finished material need be composed of double-burned and re-clinkered material.

In order to fully disclose the preferred method of practicing the present invention as well as disclose additional objects and advantages which will be derived by the method, a preferred example of a process of manufacturing Portland cement embodying the present invention will be hereafter described.

There is first produced a cement clinker by the use of such materials as are ordinarily employed in the making of Portland cement, that is to say, there is first prepared a raw mix of such materials as lime rock and clay, or lime rock and shale, or marl and sea shells and clay, whereby the desired proportions of lime, silica and alumina, as well as permissive quantities of iron, are present in the mix. The raw materials used in the mix may be proportioned in any desired manner, for example by the use of the hydraulic index or its modifications (based on the Michaelis formula) Newberry's formula, or other methods of proportioning. This raw mix is then clinkered as in the ordinary process of producing Portland cement clinker. The clinker thus produced is then ground either with or without the addition of calcium sulfate, preferably the calcium sulfate not being added.

The ground clinker thus produced may then be returned to the kiln and reburnt to a point where it is again clinkered after which the twice clinkered material may then be ground and utilized in the usual manner to form a finished Portland cement.

As a modification of the process, I may take the first produced clinker after the same is ground and add a portion of this ground clinker to a raw mix, such as generally employed in the making of standard Portland cement, for example, a mixture of lime rock and clay, or lime rock and shale, or marl and sea shells and clay in proper proportions. While the invention is not limited to the employment of any minimum or maximum amount of this ground clinker which it is to be added to the raw mix previous to calcining and clinkering the raw mix, I have obtained the best results by adding 20 per cent. of ground clinker to a properly proportioned mixture of raw materials as enumerated above of the proper analysis for the manufacture of standard Portland cement. I have so far determined that favorable results may be obtained by using amounts of ground clinker varying from 5 per cent. to 25 per cent. and it appears that other percentages outside of this range would also produce favorable results.

After the ground clinker is added to the raw mix, it is then burned as is the standard Portland cement and processed in the usual manner to make a Portland cement, namely, by burning the mixture of raw mix and ground clinker to a clinker, grinding the clinker, and adding sufficient calcium sulfate to give a required set.

By the above method of manufacturing Portland cement, it is found that the raw mix is more readily clinkered, can be clinkered at a somewhat lower temperature, and the finished cement has increased strength and hardening properties over the standard Portland cement.

The Portland cement resulting from the process described herein is capable of producing extremely high compressive strengths particularly in short periods of time. For example a 1:3 mix of Portland cement "A" (prepared in accordance with this invention) and sand, in comparison with ordinary commercial Portland cement "B", tested under identical conditions gave the following results:

*Compressive strength 1:3 mix*

| Age | A | B |
|---|---|---|
| Days | Pounds the square inch | Pounds the square inch |
| 1 | 2055 | (No strength) |
| 3 | 5061 | 1300 |
| 7 | 6312 | 2400 |
| 28 | 7268 | 4150 |

The invention is not necessarily limited to the particular process heretofore described but includes all such modifications and changes and substitution of equivalents as come within the scope of the appended claims.

I claim:

1. A process of the class described comprising burning a cement mix containing alumina, lime and silica to a clinker, and recalcining the product.

2. A process of manufacturing Portland cement which comprises burning a normal raw cement mix to a clinker, grinding the clinker, and recalcining the same to again clinker the material.

3. A process of manufacturing a Portland cement possessing the property of setting to give high early compressive strength, comprising forming a normal cement mix, burning said mix to a clinker, grinding the clinker, then recalcining the ground clinker to again clinker the material, and finally grinding the recalcined material.

4. A process of manufacturing a Portland cement capable of setting to give high early compressive strength, comprising forming a normal Portland cement mix, burning said mix to produce a clinker, grinding the clinker, and recalcining the ground clinker to again clinker the material.

5. As an article of manufacture, a Portland cement capable of setting to give high early compressive strength, produced by burning a raw Portland cement mix including alumina, lime and silica to a clinker, grinding the clinker, and recalcining the same to again clinker the material.

Signed at San Francisco, Calif. this 25th day of April, 1929.

JAMES H. COLTON.